(12) United States Patent
Hart et al.

(10) Patent No.: US 12,015,676 B2
(45) Date of Patent: Jun. 18, 2024

(54) METHOD AND APPARATUS FOR ADVANCED VEHICLE PRECONFIGURATION

(71) Applicant: FORD GLOBAL TECHNOLOGIES, LLC, Dearborn, MI (US)

(72) Inventors: Kay Hart, Kew (AU); David Sanabria, Plymouth, MI (US); Marc Mills, Novi, MI (US); Patricia Piedrahita, Birmingham, MI (US); Thomas Lee Miller, Ann Arbor, MI (US); Justin Bauer, Plymouth, MI (US); Anthony Trentacosti, South Lyon, MI (US); Colin Ho, Kanata (CA); Philip Mason, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 602 days.

(21) Appl. No.: 16/685,436

(22) Filed: Nov. 15, 2019

(65) Prior Publication Data

US 2021/0152665 A1    May 20, 2021

(51) Int. Cl.
| | |
|---|---|
| H04L 67/00 | (2022.01) |
| B60R 16/037 | (2006.01) |
| G01C 21/34 | (2006.01) |
| H04W 12/06 | (2021.01) |
| H04W 88/02 | (2009.01) |

(52) U.S. Cl.
CPC .......... *H04L 67/34* (2013.01); *G01C 21/3484* (2013.01); *H04W 12/06* (2013.01); *B60R 16/037* (2013.01); *H04W 88/02* (2013.01)

(58) Field of Classification Search
CPC .... H04L 67/34; G01C 21/3484; H04W 12/06; B60R 16/037; B60W 50/00; B60W 2050/0082
See application file for complete search history.

(56) References Cited

U.S. PATENT DOCUMENTS

| | | | |
|---|---|---|---|
| 4,491,819 A | 1/1985 | Ray | |
| 9,372,607 B1* | 6/2016 | Penilla | .................. G06F 3/0362 |
| 9,747,626 B2 | 8/2017 | Gormley | |
| 10,325,248 B2 | 6/2019 | Hammad et al. | |
| 2014/0195424 A1* | 7/2014 | Zheng | .................. G06Q 20/351 |
| | | | 705/41 |
| 2014/0337930 A1* | 11/2014 | Hoyos | ..................... H04L 63/10 |
| | | | 726/4 |

(Continued)

*Primary Examiner* — Lance Leonard Barry
*Assistant Examiner* — Mohammad Yousuf A. Mian
(74) *Attorney, Agent, or Firm* — Joseph Zane; Brooks Kushman P.C.

(57) ABSTRACT

A system includes a mobile device having a processor and memory. The mobile device determines that a new vehicle is assigned to an identified owner and responsively initiates a settings configuration process. The configuration process includes presenting existing vehicle system settings from an existing vehicle that can be transferred to the new vehicle, receiving selection of settings to be transferred, receiving editing of settings to be transferred, presenting configurable vehicle system settings for the new vehicle that can be configured, receiving configuration of the settings, and saving selected, edited and newly configured settings to a data set, which is then uploaded to a server for transfer to the new vehicle.

19 Claims, 5 Drawing Sheets

(56) References Cited

U.S. PATENT DOCUMENTS

| | | |
|---|---|---|
| 2015/0091686 A1 | 4/2015 | Ding et al. |
| 2017/0232914 A1* | 8/2017 | Brenner ................ B60R 16/037 701/36 |
| 2017/0366610 A1* | 12/2017 | Martin .................... G06F 16/27 |
| 2019/0111938 A1* | 4/2019 | Chen ................... H04L 41/0806 |
| 2019/0265868 A1* | 8/2019 | Penilla ................. B60W 40/08 |
| 2019/0315297 A1* | 10/2019 | Yamada ................ B60W 50/08 |
| 2021/0061202 A1* | 3/2021 | Ye ......................... B60R 16/037 |

\* cited by examiner

+ ADD LOCATIONS — 601

(1) Home — 603    Edit — 609

1234 Main St. — 605
West Eastville, MI 44444

(+) ADD CHARGING — 607

(1) Work    Edit

4321 Other Ct
East Westville, MI 43334

(+) ADD CHARGING

Fig. 6

+ ADD DEPARTURE TIME — 701

703
5:10 PM — 705
M, W, F
Medium Temp — 707    Edit — 709

8:10 AM
M, W, F
Cool Temp    Edit

Fig. 7

METHOD AND APPARATUS FOR ADVANCED VEHICLE PRECONFIGURATION

TECHNICAL FIELD

The illustrative embodiments generally relate to methods and apparatuses for advanced vehicle preconfiguration.

BACKGROUND

Vehicles have become advanced technological machines. While vehicles of the late $20^{th}$ century may have required little more owner setup than radio stations and seat position selection, modern vehicles have advanced computers, the ability to save user conditional settings, the ability to precondition based on user settings, advanced media devices, and countless computerized systems that can be custom configured by a manufacturer or an owner.

Vehicles are also constantly changing, which means that vehicle interfaces change and vehicle features change, but consumers are not always familiar with the changes. Thus, after owning a vehicle for several years or more, upon purchasing a new vehicle, the interfaces may be unfamiliar and the features different, even if many opportunities to set systems similar to a prior vehicle's system settings exist. Ultimately, this can lead to user frustration, and many dealers now walk customers through the sometimes complicated procedures associated with setting up a new vehicle. When the customer is in a hurry, or the dealer does not complete the full walkthrough, a customer may later experience frustration that the new vehicle settings are not fully customized, and the customer may be further frustrated that efforts spent in customizing a previous vehicle are now lost in light of the settings all being reset in the new vehicle.

SUMMARY

In a first illustrative embodiment, a system includes a mobile device that includes a processor and a memory. The processor is configured to determine that a new vehicle is assigned to an identified owner. The processor is further configured to initiate a settings configuration process, responsive to determining that the new vehicle is assigned to the identified owner.

In this embodiment, the configuration process includes presenting first existing vehicle system settings from an existing vehicle that can be transferred to the new vehicle, receiving selection of first settings to be transferred to the new vehicle, receiving editing of first settings to be transferred to the new vehicle, presenting second configurable vehicle system settings for the new vehicle that can be configured via the mobile device, receiving configuration of the second settings for assignment to the new vehicle, and saving selected first settings, edited first settings and configured second settings to a new vehicle initialization data set. The processor is also configured to upload the data set, including identification of the new vehicle, to a server for transfer to the identified new vehicle.

In a second illustrative embodiment, a vehicle includes a processor, a memory, and a cellular transceiver. The processor is configured to receive a vehicle data set, via the transceiver, defining vehicle system state settings to be applied to the vehicle. The processor is also configured to verify that a user, identified in the vehicle data set, is present within the vehicle, the verification including verifying the presence of a mobile device identified in the data set and verifying, a user personal identification number identified in the data set. The processor is further configured to, responsive to the verification, apply the vehicle data set to configure vehicle system states to reflect values for corresponding states indicated in the data set.

In a third illustrative embodiment, a vehicle includes a processor and a memory. The processor is configured to verify that a user, identified by a mobile device application as a new owner, is present within the vehicle, the mobile device application sending verification credentials to the vehicle and the vehicle verifying those credentials via a remote server. The processor is also configured to, responsive to the verification, determine whether a predefined data set, defining vehicle system state settings to be applied to the vehicle, exists for download. The processor is further configured to offer to install the data set, having been determined to exist and, responsive to user acceptance of the offer, download the data set. The processor is additionally configured to apply the vehicle data set to configure vehicle system states to reflect values for corresponding states indicated in the data set.

BRIEF DESCRIPTION OF THE DRAWINGS

FIG. 6 shows an illustrative example of a navigation setting transfer screen;

FIG. 7 shows an illustrative example of a navigation setting transfer screen;

DETAILED DESCRIPTION

Figure 1:
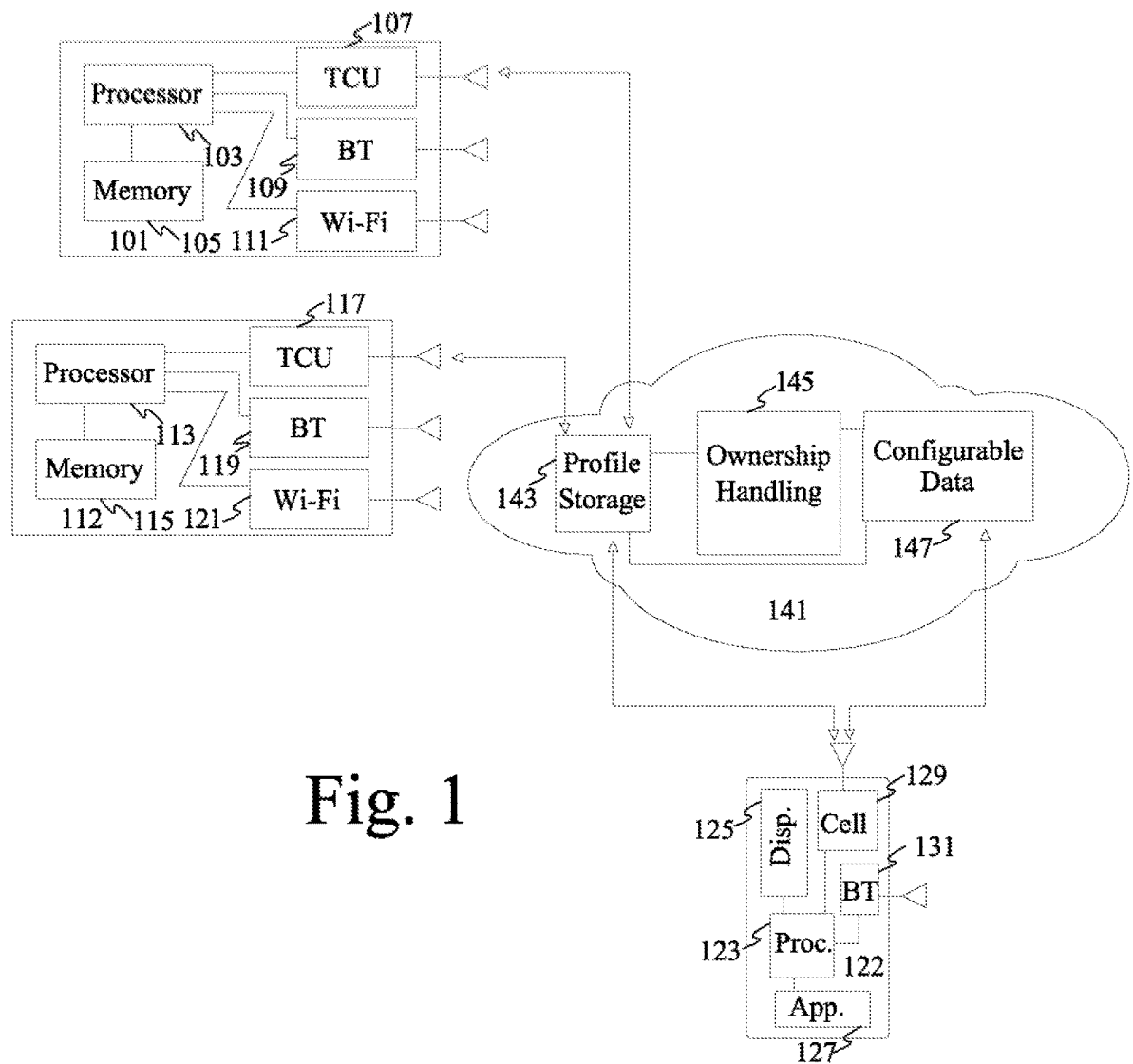
FIG. 1 shows an illustrative system for vehicle setting control and setting transfer.

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily re-purposed as a special purpose processor, until such lime as the method is completed. In another example, to the extent appropriate, firmware acting in accordance with a preconfigured processor may cause the processor to act as a special purpose processor provided for the purpose of performing the method or some reasonable variation thereof.

Users have opportunities to save a variety of configurations on memories associated with vehicle systems. Temperature settings, advanced configuration settings such as preconditioning (setting the vehicle to a certain temperature prior to departure), radio presets, driving mode preferences, navigation favorites, seat positions, application installations, and other configurable and savable system settings can all be stored in various memories in a vehicle.

Configuring all these systems, especially advanced systems such as vehicle preconditioning settings, preferred route settings, etc. can take a user significant time. When a user buys a new vehicle, the user may not want to spend a similar amount of time to add all the new settings to the new vehicle. This may be even more true if the user, for example, re-leases a vehicle every two years. Such users may simply avoid using the advanced vehicle systems (diminishing the user experience), or may become frustrated ii features have changed and interfaces have changed and the users cannot easily reset the systems in the new vehicle to match systems in a previously-owned vehicle.

Further, a user may not want to spend additional hours at a dealership, after obtaining a vehicle, or hours with a vehicle-delivery person, simply to have a new vehicle function the same as a previously-owned vehicle by configuring all the systems. Accordingly, the illustrative embodiments, and the like, propose a system whereby an entire set of vehicle system settings can be preconfigured for download to a new vehicle and, either upon obtaining the vehicle, or even prior to obtaining the vehicle, the entire set of settings can be pushed to the new vehicle and set, so the user simply has to turn on the vehicle in order to achieve a similar experience from the configurable systems.

Further, through use of a device-based interface, such as an application executing on a phone, the user can change configuration settings and refine previously set system settings to reflect any new preferences, further allowing the user to customize a vehicle before the user even lakes possession of the vehicle, in some instances.

FIG. 1 shows an illustrative system for vehicle setting control and setting transfer. In this example, a user has a current vehicle 101 and has just purchased or leased a new vehicle 112. The current vehicle 101 has a processor 103, one or more memories 105, and a plurality of communication options, such as a telematics control unit (TCU) 107 for cellular communication, a BLUETOOTH transceiver 109, a Wi-Fi transceiver 111, etc.

The memory 105 stores a number of currently configured vehicle system state settings, such as, for example, heating, ventilation, and air conditioning (HVAC) settings, radio presets, seating controls, drive-mode preferences, navigation preferences, preconditioning settings, routing settings, remote interaction settings, applications, application settings, etc. Many or all of these settings can be exported to another vehicle 112 for use in configuring that vehicle similar to the preferred configuration associated with the present vehicle 101.

The memory 105 may also associate different sets of settings with different user profiles. In one example, a parent can have one set of settings, and a child may have another set of settings. The export of settings can be profile-specific, so that if, to continue the example, the child gets a personal vehicle 112 after driving a parent vehicle 101, the child can export all the settings to the new personal vehicle 112 that are associated with the child profile, and receive the vehicle 112 having already been configured as preferred by the child when driving the parent vehicle 101.

User profiles can also be stored on mobile devices 122, and may further have a unification process associated therewith, wherein a primary user profile is established with respect to a single vehicle 112, so that the user profile is exported from one vehicle 101 to another 112, and then set as the primary profile on the new vehicle 112 (so that changes to the new vehicle 112 are reflected in the profile), while possibly still persisting as a selectable profile on the old vehicle 101. In such cases, changes to the primary profile will persist with the profile, while changes to the secondary profile (e.g., on the less-frequently-driven vehicle 101 will not persist beyond that vehicle 101).

User profiles, such as the primary version, or all versions of user profiles, may be stored in the cloud-based systems 141 in a profile storage server 143. Changes to the profile via a mobile application 127 can be pushed to the profile storage server 143, and can be distributed from the profile storage server 143 to the new vehicle 112. The new vehicle 112 may also include a processor 113, a memory 115 for storing the system state settings, a similar TCU 117, BLUETOOTH transceiver 119 and Wi-Fi transceiver 121. Setting changes shared from the prior vehicle 101 can be delivered to the new vehicle 112.

The user may have a mobile device 122 to enable or assist in vehicle profile transfer. The mobile device 122 may include a processor 123, a display 125, and one or more applications 127 stored in a device memory in this example, the application 127 allows the user to transfer the settings, as well as change settings and authenticate settings. A version of this application 127 could also be accessed via a web interface or on another computing device other than a mobile device 122. The mobile phone 122 further includes a cellular transceiver 129 and a BLUETOOTH transceiver 131.

The cloud-based systems 141 may include, for example, the profile storage server 143, an ownership handling server 145 and a server that can assist in defining configurable data 147. The profile storage 143 can store user profiles as mirrors of profiles stored on vehicles 101 and/or mobile devices 122. If the profile is stored in the cloud-based systems 141 in an accessible manner, the user can modify the profile even when the vehicle 101 is offline or unreachable, and the profile storage can push the updated profile or upload, responsive to a request from the vehicle 101, 112, the updated profile.

The ownership-handling process can identify when a user owns a vehicle 101, 112, can store a "garage" of user-owned vehicles, can communicate with the profile storage 143 to align stored profiles with vehicles in the garage, and can actively offer a profile transfer from one vehicle 101 to another 112. The ownership-handling process can identify when a user has purchased or leased a new vehicle, can add the vehicle to an owner's digital garage, and can send a notification to the mobile device application 127 that can trigger a profile update and transfer offer.

The configurable data process can identify which vehicle systems are configurable for a given vehicle, and can identify opportunities to remotely configure new and updated features on a given vehicle. Because a new vehicle 112 may have additional configurable features, this process can identify changeable features on the new vehicle 112 that did not exist on the previous vehicle 101, or features that have been updated and now have new or different configurable options. The process can also convert configurable data, such as converting radio volume settings, converting seating position settings for different cabins (to preserve distances from various controls, for example) and convert other settings where an exactly corresponding option may not exist in the vehicle 112 into which the profile is loaded.

When a user purchases or leases a new vehicle 112, the ownership-handling process 145 can push a notification to the user mobile device 122, which can cause the application 127 to launch or offer an update. The user can then interface with the display 125 of the mobile device 122 and use the application 127 to change profile settings and instruct profile transfer from the vehicle 101 to the new vehicle 112. The configuration options process 147 can present new features for configuration and can convert feature settings as discussed above.

Once the user has completed the transfer instructions, the profile storage process 143 can stores the update profile transfer instructions. Then, either before the user takes possession, or when the user takes possession of the new vehicle 112, the process 147 can send the updated profile to the new vehicle 112. The user may authenticate the transfer request when the user obtains the vehicle 112, and the user mobile device 122 may be used in conjunction with the vehicle 112 to authenticate the process via Wi-Fi or BLUETOOTH communication between the vehicle 112 and the mobile device 122.

Figure 2:
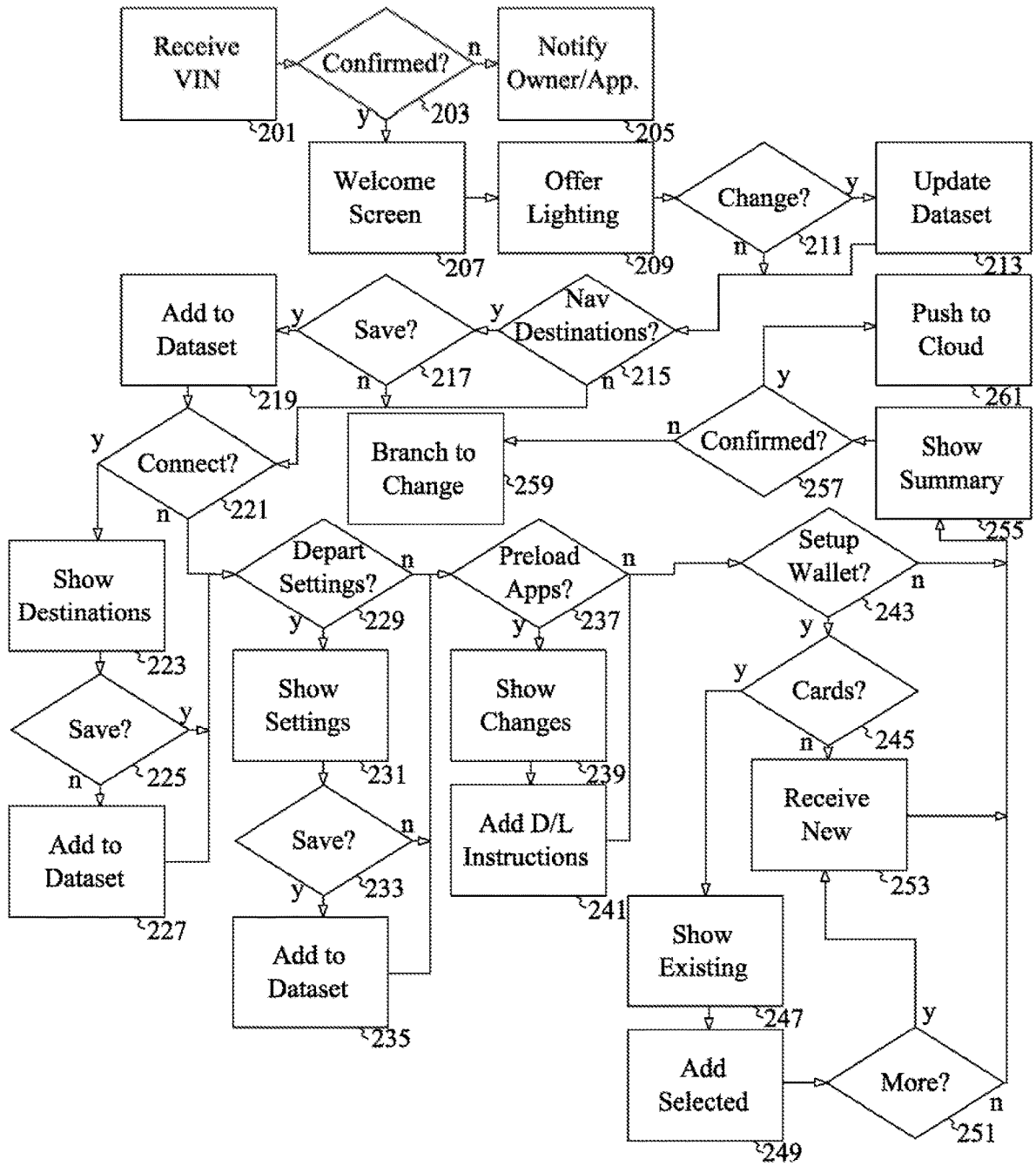
FIG. 2 shows an illustrative process for vehicle setting transfer and authentication.

FIG. 2 shows an illustrative process for vehicle setting transfer and authentication, executable, by, for example, the application 127 executing on the mobile device 122. In this example, the user identifies the new vehicle 112 based on a vehicle identification number (VIN). VINs are unique serial numbers assigned to manufactured vehicles 112, as defined in international Standards (ISO) 3779 and 4030. However, it should be noted that in other examples, different identifiers of the vehicle 112 may be used. The new vehicle 112 could also be automatically identified based on a digital notification of purchase or lease, and VIN could be sent to the mobile device 122 from the cloud ownership handling process 145.

The mobile device 122 receives the VIN at operation 201, input by the user, in this example, and then confirms at operation 203 that the VIN is a valid VIN and that the VIN applies to a vehicle 112 ascribed to the inputting user. If the VIN is invalid, the mobile device 122 may notify the user at operation 205 that the VIN is invalid, as well as sending a notification to the actual owner of the VIN, who may be notified that another user is trying to digitally modify their vehicle settings. This notification may only occur, for example, if multiple failures of the same VIN were input, indicating a more likely malicious attempt to access the vehicle, as opposed to simply representing a typo.

If the VIN is valid and accepted at operation 203, the mobile device application 127 may present a welcome screen at operation 207 that informs the user that the VIN was valid and offers an opportunity to preconfigure the vehicle 112 and/or import profile settings from another vehicle 101.

In this example, the mobile device 122 provides a series of configurable options that are discussed herein, but which are illustrative in nature and not exhaustive of all profile settings that could be configured and transferred. The first setting offered at operation 209 in this example is configurable vehicle lighting, that represents backlighting and underlighting, for example. Vehicles may include color configurable light-emitting diode (LED) lighting and users may be able to select from a variety of color themes. If the user accepts the offer to configure or change the lighting at 211, the mobile device application 127 updates a dataset at 215 with a selected color change. If the user has downloaded a profile from another vehicle 101, the mobile device application 127 may save the loaded settings from the other vehicle 101, into the dataset, or the settings may have already been reflected in a base dataset established based on the uploaded profile from the original vehicle 101.

Next, in this example, the mobile device application 127 presents an option to change and load navigation settings at operation 215. This can include, for example, loading saved favorites, defining or loading a home location, defining areas of avoidance or preferred routes, or any other feature that may be saved and configured with respect to navigation. In this example, as an example of how saved vehicle settings may be uploaded to a mobile device 122 and added to a dataset, the mobile device application 127 allows the user to define any destinations on the mobile device 122, and then provides an option to save at 217 the settings. Saved settings are added to the dataset at operation 219.

The mobile device 122 then connects to the original vehicle 101 at operation 221. Since destinations may not be saved with respect to a given profile, but rather may simply be saved to a vehicle 101, in certain instances such as this, the mobile device 122 may have to explicitly request settings from the vehicle 101. Here, the mobile device 122 receives the destinations previously saved on the vehicle 101 and presents those destinations for user review at operation 223. This can include recent destination, saved favorites, saved points of interest (POIs), saved home and work locations, etc.

If the user elects to save any or all of these destinations and settings at operation 225, where the user may also be able to selectively choose certain destinations for saving or not-saving, the mobile device 122 may add these settings to the dataset at operation 227.

Next, in this example, the mobile device 122 determines if there are any preset or changes to departure settings at operation 229. Departure settings can include, for example, vehicle preconditioning, identifying preferred departure times, and vehicle temperature settings for those times. Electric vehicles 101 may benefit from pre-warming in cold-start conditions, and the user may also want to have the cabin temperature reflect preferences, which can involve some degree of in-advance starting and running of the HVAC systems.

If there are any preconditioning or departure time settings, the mobile application 227 may show these settings at operation 231 and the user can have an option to select preferences to maintain, preferences to change, and save these selections at operation 233. The mobile device 122 then adds these preferences to the dataset at operation 235.

Also, in this example, the user has an option to pre-load applications at operation 237. The user may be able to select from applications already installed in another vehicle 101, or the user may access an application store, where compatible applications can be shown to the user at operation 239. For any selected applications, the mobile application 127 may add download and/or configuration instructions to the dataset at operation 241. Typically, although not necessarily, the mobile device 122 will not store all the applications for installation in the vehicle 112, instead instructing the vehicle 112 to download selected applications once the configuration is pushed to the vehicle 112.

Finally, in this example, the mobile device 122 may offer an option to set up a vehicle wallet at operation 243. This can be based on a credit card or bank account stored in the previous vehicle 101 or on the mobile device in a mobile wallet. The mobile device 122 may also be able to image or scan a user credit card to save the credit card to the mobile device 122 for addition to the mobile wallet.

If there are no existing cards or accounts at operation 245, the mobile device 122 may receive identification numbers or an image of a new card at operation 255. If cards already exist, the mobile device 122 may show existing cards at operation 247 for user selection. The mobile device 122 will add selected cards to the dataset at operation 249. If there are no more cards to add at operation 251, the mobile device application 127 can then show a summary of all the changes and settings for import to the new vehicle 112 at operation 255. If the user confirms the changes and import at operation 257, the mobile device 122 can send the dataset to the cloud at operation 261. The dataset can then be downloaded from the cloud-based systems 141, by the vehicle 112, at this time or at a later time if in-vehicle authentication of the user is needed. If the user does not confirm all changes, the process may branch to anything that needs to be re-changed or edited.

Figure 3:
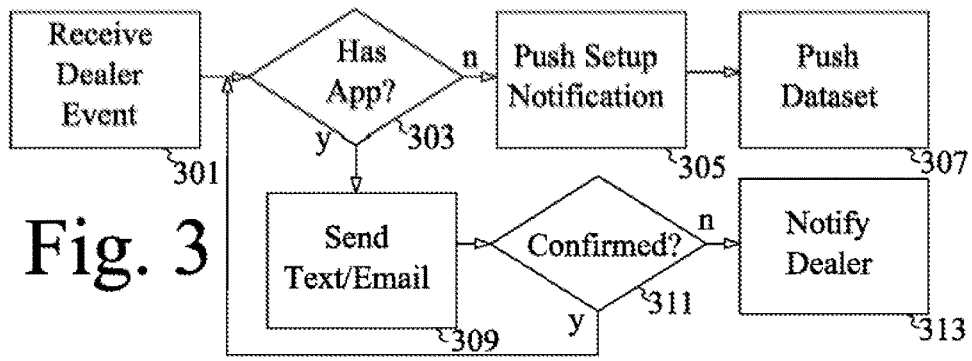
FIG. 3 shows an illustrative process for setting transfer initialization.

FIG. 3 shows an illustrative process for setting transfer initialization. In this example, a cloud server of the cloud-based systems 141, such as the ownership management server 145 is capable of detecting the ownership transfer of a vehicle. The server 145 receive notification of a dealer event at operation 301, indicating that a vehicle has been bought or leased, as well as receives a vehicle identification number and identification of the new owner. If the owner has a profile in the profile server 143, the process detects what settings are already ascribed to that profile. The server 145 also determines, at 303, whether the owner has the application 127 installed, which will allow the owner to use the mobile device 122 to transfer a profile.

If the owner has the application 127 installed, the server 145 pushes a setup notification at operation 305 to the application 127. The application can then enter a process, such as the process described in detail with respect to FIG. 2. The server 145 may also push a VIN to the application.

In addition, if the owner already has a user profile established, that includes one or more vehicle settings, the server 145 may instruct the profile server 143 to push the profile to the mobile device 122 as well. The profile server 143 can use an existing profile or can download a profile from an already-owned vehicle 101. If the user owns multiple vehicles 101, the user can be asked to identify which vehicle 101 should be used as the basis for a profile transfer, by a request from the profile server to the mobile application 127. This can also include selection of a specific owner profile associated with the vehicle 101. Once a suitable profile vehicle is chosen, the server 143 can load the selected profile and settings to the mobile device 122 for use by the application 127.

If the owner does not have the application 127 installed, the server 145 can send a message to the owner at operation 309 (e.g., as a text message or an email message), offering to assist the owner in downloading and installing the application 127. Once the application 127 has been confirmed as installed at 311, the process can proceed with the loading of the user profile. If the application 127 is not installed, the server 145 may notify the dealer at operation 313, which can assist the dealer in guiding the new owner in application installation, so that the owner can preconfigure the vehicle 112.

Figure 4:
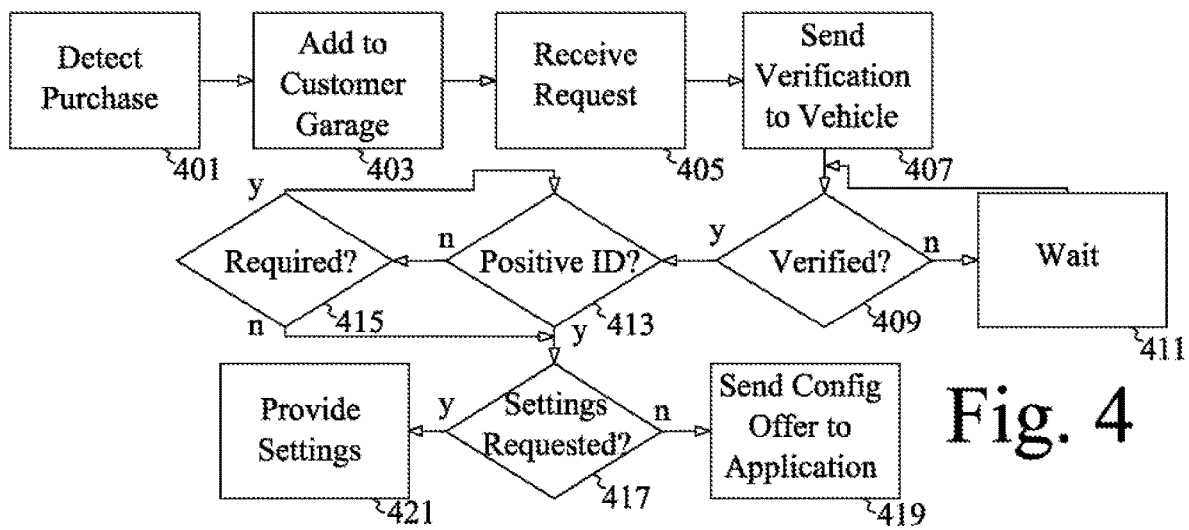
FIG. 4 shows an illustrative process for setting transfer configuration.

FIG. 4 shows an illustrative process for setting transfer configuration. This process can execute on the mobile device 122 and/or on the cloud server(s) 143, 145, and the entities can work in conjunction as appropriate. In this example, a server, such as the server 145, detects a purchase of a vehicle at operation 401. This detection can be based on an indication from an owner or a dealer, and includes identification of the vehicle and identification of the owner. The server 145 then adds the vehicle 112 to the owner digital garage, giving the owner preconfiguration rights.

In this example, the preconfiguration is not saved to the vehicle 112 until the owner is authenticated at the vehicle 112, to avoid inadvertently configuring a vehicle 112 that is ultimately not possessed by the identified owner. The server 145 receives a configuration request from the owner mobile application 127, which may identify the owner device. The server 145 then sends verification instructions to the vehicle 112 at 407, which also can include device identification. Since the vehicle 112 now has identification of a verified owner device 122, then when the device 122 is in the vehicle and is in communication with the vehicle 112, the vehicle 112 can authenticate the owner and the device and process any profile configuration request.

When the owner is verified by the vehicle at operation 409, the server 413 determines if the verified device includes a positive owner identification at operation 413. As an additional level of security, in this example, the user inputs a PIN at the vehicle as well as having the phone 122 be verified, so the PIN specifically identifies the user at the vehicle and cloud server 145. If the PIN does not identify the user, the process determines if such a PIN is required at operation 415, and, if so, requests the PIN again. If the user mobile device is not yet verified at the vehicle 112, the server waits at operation 417 for this verification to occur.

One the user is identified and the mobile device is verified as being in the vehicle 112, the vehicle 112 may request a settings download, based on pending instructions or instructions from the mobile device 122. If the server determines that settings are requested at operation 417, the server 145 provides the settings to the vehicle 112, or, for example, instructs a profile server 143 to provide the settings to the vehicle 112. If there are no requested settings, the server can send an offer to the application 127 for the user to configure the vehicle 112 and/or export a profile from another vehicle 101, if such a profile and/or vehicle exists.

Figure 5:
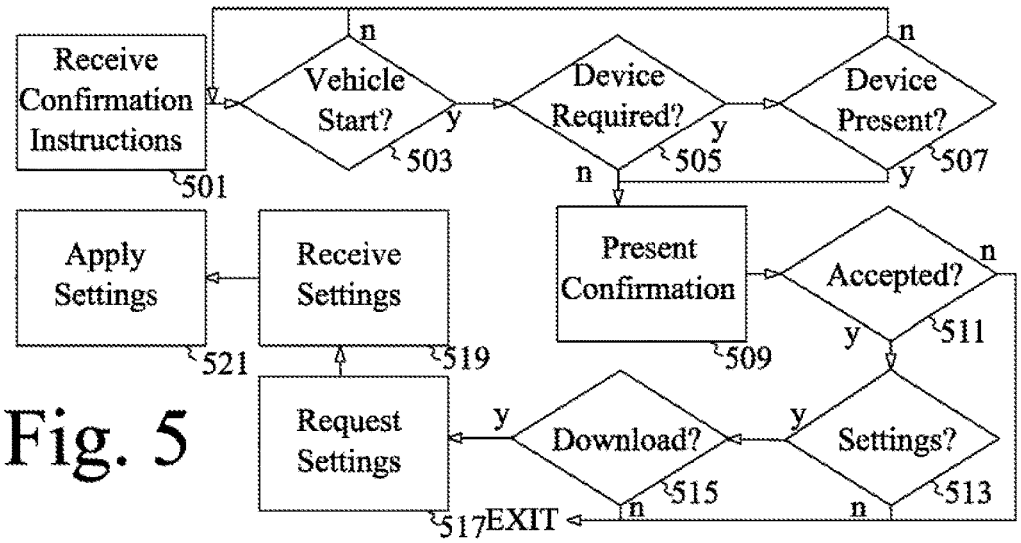
FIG. 5 shows an illustrative process for setting installation.

FIG. 5 shows an illustrative process for setting installation. In this example, the vehicle 112 receives configuration instructions from the server 145 at operation 501. The vehicle 112 will verify the mobile device 122 and/or PIN prior to installing the profile, again, in this example, to ensure the user has taken possession of the vehicle 112. If the user can be verified remotely, or in some instances, not verified at all, the purchase verification being sufficient, the vehicle 112 may not wait for the vehicle 112 to be powered at operation 503 and the user to be verified at operation 505 or operation 507.

If the device verification is required at 505 and the mobile device 122 is present at operation 507, the vehicle 112 confirms that the user is verified and presents a confirmation request for the user at operation 509. If verification is not required, the vehicle 112 may simply present this request the first time the vehicle 112 is powered following preconfiguration, whether or not the device 122 is present.

If the user confirms at operation 511 that the configuration should be downloaded to the vehicle 112, and if settings exist in the profile server 145 as determined at operation 513, the vehicle determines if the settings need to be downloaded at operation 515, or whether the settings have already been downloaded at a prior point (or are available from the mobile device in lieu of the profile server 143). If download is required at operation 515, the vehicle 112 requests the settings at operation 517 and receives the settings at operation 519. Then, as appropriate, the vehicle 112 can apply the downloaded settings at operation 521 to preconfigure the vehicle 112 as instructed by the user during the preconfiguration process.

FIG. 6 shows an illustrative example of a navigation setting transfer screen. This is an illustrative example of a screen a user might see on a mobile device 122 display 125 or a personal computer after requesting setting transfer. This is an illustrative set of navigation settings that has been obtained from an existing vehicle 101.

There is an option to add additional locations 601, or the user can view the existing locations. The locations may include, for example, an identifier 603, that is a user saved identifier or a business name. The locations may also include a physical address 605. The options may further include an option to add this location as a charging point 607. Further, the user may edit 609 the location.

FIG. 7 shows an illustrative example of a navigation setting transfer screen. This shows examples of vehicle preconditioning settings imported from an existing vehicle 101. The settings include an option to add a new departure time 701. Each identified setting, in this example, includes a planned departure time 703. The settings also include applicable days of the week 705 and a preferred temperature setting 707, which can also be set in degrees. The vehicle 112 implementing the settings may include logic that determines, for example, based on a target temperature, when to actually start the vehicle 112 (e.g., based on exterior and current interior temperatures) to achieve the desired temperature. The user can also edit 709 these options to change selections or parameters.

Figure 8A:
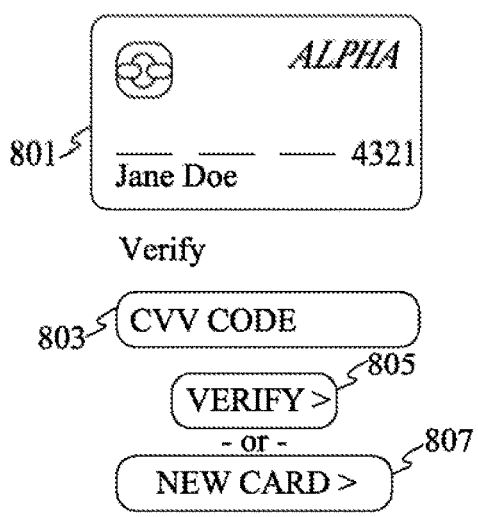
FIG. 8A shows an illustrative example of a wallet setting transfer screen.

FIG. 8A shows an illustrative example of a wallet setting transfer screen. In this example, a card 801 that is already part of an existing wallet (on the mobile device 122 or transferred from the vehicle 101 is displayed. The user can be asked to enter the CVV code in space 803, to verify possession of the card. Then the user can elect to verify 805 and/or add 807 a new card.

Figure 8B:
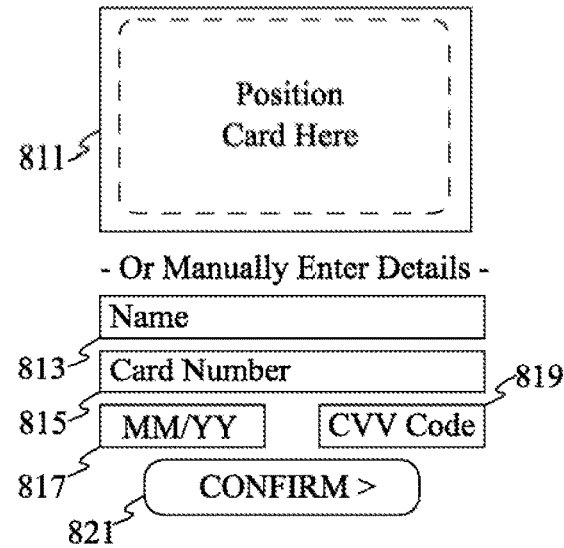
FIG. 8B shows an illustrative example of a new account addition screen.

FIG. 8B shows an illustrative example of a new account addition screen. If the user elects to add a new card the display can show a camera capture window 811, which reflects a camera view (from a camera of the mobile device) and allows the user to automatically capture a card when positioned within the dashed window.

Alternatively, the user can manually enter the user name 813, card number 815, expiration date 817 and CVV Code 819. The user can then confirm the card, and the mobile device 122 may attempt to verify the card is a valid card through a suitable verification process (e.g., the user did not mistype a number, did not enter an expired card, etc).

Figure 9:
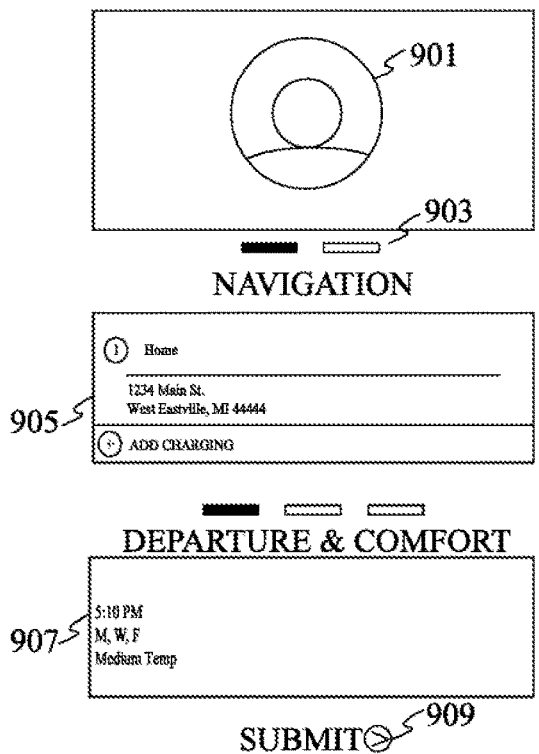
FIG. 9 shows an illustrative: example of an account summary screen.

FIG. 9 shows an illustrative example of an account summary screen. This summarizes all the changes that will be imported to and configured on the new vehicle 112. This can show a user picture 901 and a number of the options that were selected during a configuration process.

For example, there is a navigation summary, with the option to scroll 903 between selected destinations to be added to the new vehicle. One or more of the selected destinations may be shown 905 as the user scrolls through the options.

There may also be a departure summary, again with a scrolling option and showing the various preconditioning options 907 configured by the user during the preconfiguration process. The user can then submit 909 these options, which can cause the mobile device 122 to save the options and/or send the options to a cloud server for storage and/or delivery to a vehicle 112.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:
1. A system comprising:
a mobile device including a processor and a memory, the mobile device being configured to access a vehicle account including first vehicle for which a user has first vehicle system settings, wherein the processor is configured to
determine that a second vehicle has been associated with the vehicle account;
initiate a settings configuration process, responsive to determining that the second vehicle is assigned to the vehicle account, wherein the configuration process configures the processor to:
determine which settings of the first vehicle that are compatible for transfer to the second vehicle;
present the first vehicle system settings that are compatible for transfer to the second vehicle;

receive selection from the first vehicle system settings of selected first settings to be transferred to the second vehicle;

receive edits of the first vehicle system settings to create edited first settings to be transferred to the second vehicle;

present second vehicle system settings for the second vehicle that can be configured via the mobile device;

receive configuration of the second vehicle system settings to create configured second settings for assignment to the second vehicle;

save the selected first settings, the edited first settings and the configured second settings to a second vehicle initialization data set; and upload the second vehicle initialization data set, including identification of the second vehicle, to a server for transfer to the second vehicle.

2. The system of claim 1, wherein the processor is further configured to determine that the second vehicle is assigned to an identified owner based on input received from the owner at a mobile device.

3. The system of claim 2, wherein the processor is further configured to verify that the second vehicle is assigned by comparing an input vehicle identification number to a record of vehicle identification numbers indicating ownership.

4. The system of claim 1, wherein the processor is further configured to determine that the second vehicle is assigned to an identified owner based on an indication received at the mobile device from a server, the indication including owner identification and identification of the second vehicle.

5. The system of claim 1, wherein the processor is further configured to retrieve the first existing vehicle system settings from an identified existing vehicle.

6. The system of claim 1, wherein the processor is further configured to retrieve the first existing vehicle system settings from a server storing user profiles and vehicle system settings.

7. The system of claim 6, wherein the server storing user profiles and vehicle system settings stores a user profile for the identified user that has the first existing vehicle settings associated therewith.

8. The system of claim 1, wherein the processor is further configured to retrieve the second configurable vehicle system settings from a server identifying configurable vehicle system settings for the second vehicle.

9. The system of claim 1, wherein the processor is further configured to send the data set to the second vehicle, responsive to the second vehicle requesting the data set from the mobile device, following authentication of the mobile device by the second vehicle.

10. The system of claim 1, wherein the authentication includes verifying a user personal identification number input into the mobile device as part of an authentication process executed by the second vehicle to authenticate the mobile device.

11. The system of claim 1, wherein at least one of the first or second settings includes vehicle interior lighting options.

12. The system of claim 1, wherein at least one of the first or second settings includes vehicle navigation settings.

13. The system of claim 12, wherein the navigation settings include identification of predefined addresses to be saved to the second vehicle as saved addresses.

14. The system of claim 1, wherein at least one of the first or second settings includes vehicle preconditioning settings.

15. The system of claim 1, wherein at least one of the first or second settings includes vehicle wallet settings, the vehicle wallet settings including identification of at least one payment method for a vehicle wallet.

16. The system of claim 15, wherein the processor is configured to image a user payment card to establish the at least one payment method.

17. A vehicle comprising:
a processor;
a memory; and
a cellular transceiver, and wherein the processor is configured to:
verify that a user, identified by a mobile device application as a new owner, is present within the vehicle, the mobile device application sending verification credentials to the vehicle and the vehicle verifying those credentials via a remote server;
responsive to the verification, determine whether a predefined data set, defining vehicle system state settings to be applied to the vehicle, exists for download;
offer to install the data set, having been determined to exist;
responsive to user acceptance of the offer, download the data set; and
apply the vehicle data set to configure vehicle system states to reflect values for corresponding states indicated in the data set.

18. The vehicle of claim 17, wherein the processor is further configured to determine whether the predefined data set exists for download from the mobile device.

19. The vehicle of claim 17, wherein the processor is further configured to determine whether the predefined data set exists for download from a remote server saving data sets defined by users for use in configuring vehicles belonging to respective users.

* * * * *